US008754827B2

(12) United States Patent
Braghis et al.

(10) Patent No.: US 8,754,827 B2
(45) Date of Patent: Jun. 17, 2014

(54) UPDATING AN IMAGE

(75) Inventors: Florin Braghis, Stockholm (SE);
Renārs Lediņš, Tallinn (EE); Jonas Lindblom, Solna (SE)

(73) Assignee: Skype, Dublin (IE)

( * ) Notice: Subject to any disclaimer, the term of this patent is extended or adjusted under 35 U.S.C. 154(b) by 858 days.

(21) Appl. No.: 12/924,133

(22) Filed: Sep. 21, 2010

(65) Prior Publication Data

US 2012/0001832 A1    Jan. 5, 2012

(30) Foreign Application Priority Data

Jun. 30, 2010    (GB) .................................. 1011002.1

(51) Int. Cl.
*G09G 5/00*    (2006.01)

(52) U.S. Cl.
USPC ............................................ 345/2.1; 345/1.3

(58) Field of Classification Search
USPC .................................................... 345/2.2, 1.3
See application file for complete search history.

(56) References Cited

U.S. PATENT DOCUMENTS

| | | | |
|---|---|---|---|
| 5,072,409 A | 12/1991 | Bottorf et al. | |
| 5,321,750 A | 6/1994 | Nadan | |
| 5,471,248 A | 11/1995 | Bhargava et al. | |
| 5,732,094 A | 3/1998 | Petersen et al. | |
| 5,959,676 A * | 9/1999 | Kondo | 348/421.1 |
| 5,990,852 A | 11/1999 | Szamrej | |
| 7,672,005 B1 | 3/2010 | Hobbs et al. | |
| 7,899,864 B2 | 3/2011 | Margulis et al. | |
| 7,933,955 B2 | 4/2011 | Khalatian | |

(Continued)

FOREIGN PATENT DOCUMENTS

| | | |
|---|---|---|
| EP | 2019553 | 1/2009 |
| EP | 2 161 713 A1 | 3/2010 |

(Continued)

OTHER PUBLICATIONS

PCT Search Report and Written Opinion, Application No. PCT/EP2011/060893, (Sep. 19, 2011), 12 Pages.

(Continued)

*Primary Examiner* — Abbas Abdulselam
*Assistant Examiner* — Shawna Stepp Jones
(74) *Attorney, Agent, or Firm* — Sonia Cooper; Jim Ross; Micky Minhas

(57) ABSTRACT

Method, terminal, network and computer program product for processing updates of an image for transmission from a first terminal to a second terminal for use in screen sharing between the first terminal and the second terminal wherein updates to the image displayed on a first display at the first terminal are also displayed on a second display at the second terminal. The image is divided into an array of contiguous sub-tiles, each sub-tile comprising more than one picture element of the image. It is determined that a plurality of sub-tiles of the image have changed at the first terminal and at least one of said changed sub-tiles and at least one contiguous sub-tile are selected to form a tile. The tile is encoded for transmission to the second terminal, said encoding determining sub-tile data identifying which sub-tiles are included in the tile such that the image can be updated at the second terminal in accordance with the changes to said changed sub-tiles, wherein the configuration of the tile is flexible such that the number of contiguous sub-tiles encoded in the tile can be varied.

29 Claims, 3 Drawing Sheets

(56) References Cited

U.S. PATENT DOCUMENTS

| | | |
|---|---|---|
| 2003/0085923 A1 | 5/2003 | Chen et al. |
| 2004/0080504 A1 | 4/2004 | Salesky et al. |
| 2004/0136594 A1 | 7/2004 | Myers |
| 2004/0136598 A1 | 7/2004 | Le Leannec et al. |
| 2005/0289176 A1 | 12/2005 | Johnston et al. |
| 2006/0002315 A1* | 1/2006 | Theurer et al. ............... 370/261 |
| 2006/0010392 A1 | 1/2006 | Noel et al. |
| 2006/0023063 A1 | 2/2006 | Okawa |
| 2006/0031779 A1 | 2/2006 | Theurer et al. |
| 2006/0140494 A1 | 6/2006 | Ishikawa |
| 2006/0168284 A1* | 7/2006 | Holthe ......................... 709/231 |
| 2006/0233518 A1* | 10/2006 | Hsieh ............................ 386/95 |
| 2006/0259939 A1 | 11/2006 | Chu et al. |
| 2007/0124474 A1 | 5/2007 | Margulis |
| 2007/0192509 A1 | 8/2007 | Ohtsuka et al. |
| 2007/0263007 A1 | 11/2007 | Robotham et al. |
| 2008/0002894 A1 | 1/2008 | Hayon et al. |
| 2008/0114848 A1 | 5/2008 | Lira |
| 2009/0016622 A1 | 1/2009 | Itakura |
| 2009/0300108 A1 | 12/2009 | Kohno |
| 2010/0215280 A1 | 8/2010 | Abdo et al. |
| 2011/0010629 A1 | 1/2011 | Castro et al. |
| 2011/0173266 A1 | 7/2011 | Ohashi et al. |
| 2011/0276900 A1 | 11/2011 | Khan et al. |
| 2012/0005301 A1 | 1/2012 | Braghis et al. |
| 2012/0042252 A1 | 2/2012 | Neerudu et al. |

FOREIGN PATENT DOCUMENTS

| | | | |
|---|---|---|---|
| GB | 2 299 233 A | | 9/1996 |
| GB | 2 318 956 A | | 5/1998 |
| JP | 2005/269272 A | | 3/2004 |
| WO | WO-2010143727 | | 12/2010 |

OTHER PUBLICATIONS

Search Report, Application No. GB1011004.7, (Oct. 20, 2011), 1 page.

Final Office Action, U.S. Appl. No. 12/924,147, (Apr. 12, 2013), 32 pages.

Search Report under Section 17(5), Application No. GB1011002.1, Date of Search: Oct. 21, 2011, 1 pg.

Notification of Transmittal of the International Search Report and the Written Opinion of the International Searching Authority, or the Declaration, PCT/EP2011/060896, Date of mailing: Oct. 7, 2011, 12 pp.

Non-Final Office Action, U.S. Appl. No. 12/924,147, (Oct. 12, 2012), 29 pages.

Brinkmann, Marcus et al., "vncviewer (1) Manual Page", Retrieved from: <http://tightvnc.com/vncviewer.1.html> on Oct. 1, 2012,(Mar. 6, 2007), 7 pages.

Examination Report, EP Application No. 11728001.6, Nov. 19, 2013, 7 pages.

Non-Final Office Action, U.S. Appl. No. 12/924,147, Aug. 2, 2013, 32 pages.

"Final Office Action", U.S. Appl. No. 12/924,147, Jan. 15, 2014, 40 pages.

* cited by examiner

UPDATING AN IMAGE

RELATED APPLICATION

This application claims priority under 35 U.S.C. §119 or 365 to Great Britain Application No. 1011002.1, filed Jun. 30, 2010. The entire teachings of the above application are incorporated herein by reference.

FIELD OF THE INVENTION

The present invention relates to updating an image. In particular, the present invention relates to encoding changes to an image at a first terminal for transmission to a second terminal.

BACKGROUND

When an image at a first computing terminal is changed, data can be generated which can subsequently be used to form the changed image. Rather than generating data representing the whole changed image, it can be beneficial to generate data representing the changes that have been made to the image, wherein the original image and the data representing the changes made thereto can be used together to form the changed image.

It can be particularly useful to generate data representing the changes to an image when the changes to the image are to be transmitted from a first terminal to a second terminal. There are often bandwidth constraints in transmitting data between terminals, so it can be beneficial to reduce the amount of data that is transmitted between the terminals. Therefore, transmitting data representing the changes to an image, rather than data representing the whole changed image can be beneficial since less data is required to be transmitted. In this way, updates to an image at a first terminal can be transmitted to a second terminal.

One example in which it is useful to transmit changes made to an image from a first terminal to a second terminal is when implementing screen sharing. Screen sharing is a useful technique for communication between two terminals. Images displayed on a first screen at a first terminal (or "sharer" terminal) can be transmitted to a second terminal (or "viewer" terminal) and displayed on a second screen at the second terminal. As an example, screen sharing can be particularly useful when a first user at the first terminal (the "sharer") is trying to explain what they are seeing on their screen to a second user at the second terminal (the "viewer") because with screen sharing the viewer can see images that are displayed on the sharer's screen.

When the image at the sharer terminal is changed then those changes are transmitted to the viewer terminal, and the image displayed on the viewer's screen can be updated accordingly to reflect the changes. When only certain areas of the image are changed at the sharer terminal then screen rectangles representing those areas in need of updating are transmitted from the sharer terminal to the viewer terminal. In this way it is not necessary to update the whole of the image when only certain areas of the image are in need of updating.

An example protocol for use in transmitting the changes of an image between a server terminal and a client terminal in a Virtual Network Computing system is the RFB (remote framebuffer) protocol (as described in "The RFB Protocol" by Tristan Richardson, RealVNC Ltd, Version 3.8). The display side of the protocol is based around a single graphics primitive: "put a rectangle of pixel data at a given x,y position". A picture element, or "pixel", and is the smallest unit of the image that can be controlled. Different encoding schemes for encoding the pixel data can be used. A sequence of the rectangles forms a framebuffer update which represents a change from one valid framebuffer state to another.

One type of encoding which may be used to encode the rectangles in the RFB protocol is RRE encoding (rise-and-run-length encoding). In RRE encoding a rectangle of pixel data to be encoded is divided into rectangular subregions ("subrectangles") each of which consists of pixels of a single value. The pixel data for a rectangle is then sent to the client terminal in terms of subrectangles representing sections of the rectangle which have a single pixel value.

Another type of encoding which may be used to encode the rectangles in the RFB protocol is Hextile encoding, which is a variation on the RRE idea. In Hextile encoding each rectangle of pixel data to be encoded is split up into tiles of size 16×16 pixels. Each tile is either encoded as raw pixel data, or as a variation on RRE encoding. The pixel data for a rectangle is then sent to the client terminal in terms of the 16×16 tiles.

Other types of encoding may be used to encode the rectangles in the RFB protocol, such as ZRLE encoding (Zlib Run-Length Encoding) in which zlib data when uncompressed represents tiles of 64×64 pixels (similar to the 16×16 tiles of Hextile encoding) and where ZRLE encoding makes use of compressed pixels which can be just 3 bytes long. Other types of encoding which can be used in the RFB protocol are Raw and CopyRect as would be apparent to a skilled person (and as described in "The RFB Protocol" by Tristan Richardson, RealVNC Ltd, Version 3.8).

It is often preferable for the updating of the image on the viewer's screen to be performed in real-time as the image on the sharer's screen is changed. This is particularly preferable when, for example, the sharer and the viewer are simultaneously engaged in screen sharing and a communication session such as a call or an instant messaging session.

SUMMARY

According to a first aspect of the invention there is provided a method of processing updates of an image for transmission from a first terminal to a second terminal for use in screen sharing between the first terminal and the second terminal wherein updates to the image displayed on a first display at the first terminal are also displayed on a second display at the second terminal, the image being divided into an array of contiguous sub-tiles, each sub-tile comprising more than one picture element of the image, the method comprising: determining that a plurality of sub-tiles of the image have changed at the first terminal; selecting at least one of said changed sub-tiles and at least one contiguous sub-tile to form a tile; and encoding the tile for transmission to the second terminal, said encoding determining sub-tile data identifying which sub-tiles are included in the tile such that the image can be updated at the second terminal in accordance with the changes to said changed sub-tiles, wherein the configuration of the tile is flexible such that the number of contiguous sub-tiles encoded in the tile can be varied.

According to a second aspect of the invention there is provided a terminal for transmitting updates of an image to a further terminal for use in screen sharing between the terminal and the further terminal wherein updates to the image displayed on a first display at the terminal are also displayed on a second display at the further terminal, the image being divided into an array of contiguous sub-tiles, each sub-tile comprising more than one picture element of the image, the terminal comprising: determining means for determining that a plurality of sub-tiles of the image have changed; selecting means for selecting at least one of said changed sub-tiles and at least one contiguous sub-tile to form a tile; and encoding means for encoding the tile for transmission to the second terminal, said encoding means being configured to determine sub-tile data identifying which sub-tiles are included in the tile such that the image can be updated at the further terminal in accordance with the changes to said changed sub-tiles, wherein the configuration of the tile is flexible such that the number of contiguous sub-tiles encoded in the tile by the encoding means can be varied.

According to a third aspect of the invention there is provided a network comprising: a terminal according to the second aspect of the invention; and the further terminal, wherein the further terminal comprises: means for receiving the encoded tile; and means for updating the image at the further terminal in accordance with the changes to said changed sub-tiles.

According to a fourth aspect of the invention there is provided a computer program product comprising computer readable instructions for execution by computer processing means at a first terminal for transmitting updates of an image from the first terminal to a second terminal for use in screen sharing between the first terminal and the second terminal wherein updates to the image displayed on a first display at the first terminal are also displayed on a second display at the second terminal, the image being divided into an array of contiguous sub-tiles, each sub-tile comprising more than one picture element of the image, the instructions comprising instructions for: determining that a plurality of sub-tiles of the image have changed at the first terminal; selecting at least one of said changed sub-tiles and at least one contiguous sub-tile to form a tile; and encoding the tile for transmission to the second terminal, said encoding determining sub-tile data identifying which sub-tiles are included in the tile such that the image can be updated at the second terminal in accordance with the changes to said changed sub-tiles, wherein the configuration of the tile is flexible such that the number of contiguous sub-tiles encoded in the tile can be varied.

In preferred embodiments the step of forming a tile comprises determining the configuration of the tile in dependence upon the arrangement of the changed sub-tiles in the array.

Since the configuration of the tile is flexible, it is possible to change the configuration of the tile in order to include the updated sub-tiles in an efficient manner. In particular, the configuration of the tile can be adapted to suit the particular arrangement of changed sub-tiles. More than one tile may be used to encode the particular arrangement of changed sub-tiles. For example, in some situations it may be preferable to encode two different changed sub-tiles in two different tiles, whereas in other situations it may be preferable to encode two different changed sub-tiles in a common tile. The configuration of the tiles can be adapted to suit the distribution of the changed sub-tiles. In this sense the mapping of the sub-tiles into the tile(s) can be adapted. For example an algorithm may adapt the configuration of the tiles to optimize the encoding of the changed sub-tiles in the encoded tile(s).

This means that each time the image is updated, a tile which represents changed sub-tiles may have different configurations. The encoding of the tile therefore includes the sub-tile data to identify to the second terminal which sub-tiles are included in the encoded tile. This is useful for the second terminal in using the encoded tiles to update the image at the second terminal.

The configuration of the tile(s) may be determined in dependence upon a number of different factors. For example, the configuration of the tile(s) may be determined in dependence upon the complexity of encoding the tile(s) (which may include the algorithmic or search complexity), e.g. with an aim to minimize the complexity. One of the main advantages of using the sub-tiles (as compared to using units of size 1×1 pixel, i.e. no sub-tiles) is that operations like "finding which sub-tiles have changed" and "what is the smallest rectangle containing all changed sub-tiles" becomes far less complex, e.g. in terms of requiring less processing power and taking less time to compute. This can be seen as a "search" or optimization problem and is therefore referred to as a "search complexity". As an example, where the image is divided into just two sub-tiles next to each other, the "search" entails checking if the left sub-tile or the right sub-tile have changed. This can be done in a very efficient way compared to having totally unconstrained tiles.

The configuration of the tile(s) may be determined in dependence upon the amount of data in the encoded tile(s), e.g. with an aim to minimize the amount of data. The configuration of the tile(s) may be determined in dependence upon the tile header overhead of the encoded tile(s), e.g. with an aim to minimize the tile header overhead. The configuration of the tile(s) may be determined in dependence upon the compression efficiency of compressing the encoded tile(s), e.g. with an aim to maximize the compression efficiency. The configuration of the tile(s) may be determined in dependence upon other factors than those mentioned here as would be apparent to a person skilled in the art. An algorithm may be used to determine the configuration of the tile(s).

Where the configuration of the tile(s) is determined in dependence upon more than one factor it may be that it is not possible to arrive at an optimum configuration for all of the factors, and the determined configuration may be a compromise for conflicting factors. For example, where there are three changed sub-tiles, none of which are contiguous with each other, it may be optimal from the point of view of minimizing the amount of data in the encoded tile(s) to have three separate encoded tiles for the three changed sub-tiles. However, it may be optimal from the point of view of bandwidth efficiency to have just one encoded tile including all three changed sub-tiles, if for example the changed sub-tiles are relatively close to each other in the image and the image content is highly compressible. Taking into account all of the factors it may be determined that the overall optimal configuration for the tile(s) is to have two encoded tiles, one of which includes two of the changed sub-tiles and the other of which includes the remaining one of the changed sub-tiles. The overall optimal configuration for the tile(s) may be dependent upon the arrangement of the changed sub-tiles within the image.

The flexibility of the configuration of the encoded tile(s) allows changes to the image to be efficiently encoded in the encoded tile(s). This is particularly useful for use in a method such as a screen sharing method in which changes may occur to different areas of the image at different times, such that the optimal configuration of the encoded tile(s) may change from each update of the image to the next. The flexibility allows the configuration of the tile(s) to be adapted on each update to suit the particular arrangement of changed sub-tiles for that particular update.

The prior art screen sharing systems have no notion of a flexible configuration of tiles or the algorithm as described above, or of sub-tiles. In the RFB protocol described above rectangles of pixel data to be updated are determined and are then encoded (e.g. using RRE, Hextile or ZRLE encoding). According to the RRE encoding scheme the rectangle is encoded as a plurality of subrectangles and according to the Hextile and ZRLE encoding schemes the rectangle can be encoded as a plurality of tiles (e.g. of size 16×16 or 64×64 pixels). Therefore in the RFB protocol a rectangle to be transmitted from the first terminal to the second terminal can be encoded as a plurality of smaller units (i.e. subrectangles or tiles). However, the use of these smaller units is only for the purpose of encoding the rectangles for transmitting the rectangles to the second terminal. In the RFB protocol, the rectangles which include changes to the image are first determined before dividing the rectangles into smaller units. This is in contrast to embodiments of the present invention in which the image is divided into sub-tiles, and further computations are based on the sub-tiles, i.e. the changes to the image are determined on the sub-tile level. The changed sub-tiles can then be grouped together into tiles. Since the configuration of the tiles is flexible the tiles can efficiently cover the changed sub-tiles. By determining the changes to the image on the sub-tile level the configuration of the formed tiles can be adapted to the specific arrangement of the changes made to the image. Furthermore, determining the changes to the image on the sub-tile level is advantageous over not using sub-tiles (i.e. just determining changed pixels) because the computational complexity of computing the update of the image is significantly reduced.

Embodiments of the present invention advantageously allow screen sharing to be performed in an efficient manner to thereby facilitate substantially real-time updating of the image at the viewer terminal in response to changes to the image at the sharer terminal.

In some embodiments encoded tiles are transmitted directly from the sharer terminal to the viewer terminal. In alternative embodiments encoded tiles are transmitted from the sharer terminal to a server. The encoded tiles can then be transmitted from the server to the viewer terminal.

Preferred embodiments facilitate flexible and efficient (in terms of computational complexity as well as in terms of bandwidth usage) encoding of screen images.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
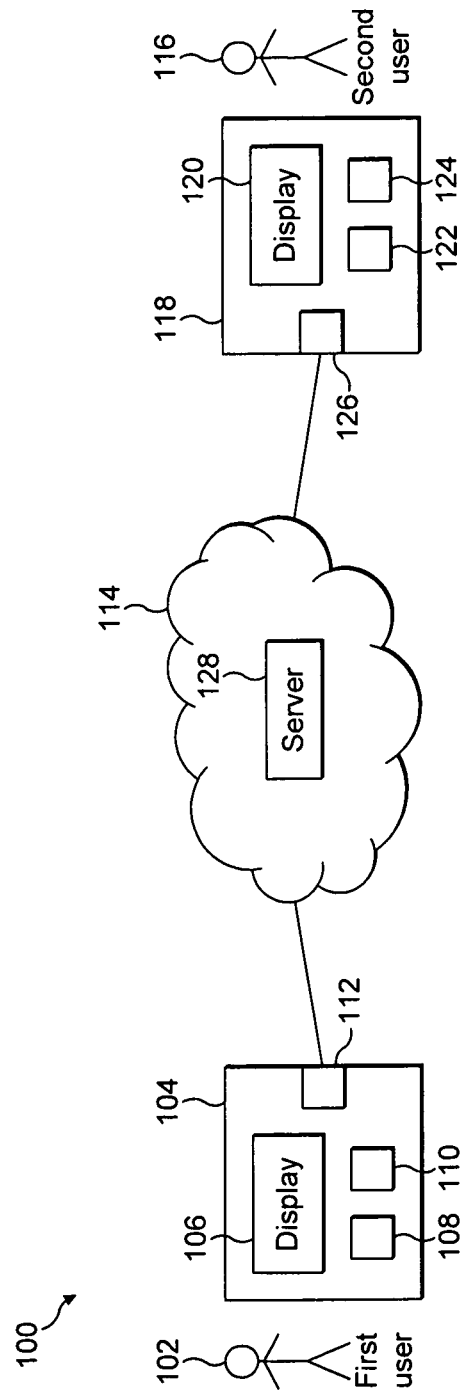
FIG. 1 is a schematic representation of a communications network according to a preferred embodiment.

With reference to FIG. 1 there is now described a communications network 100 in which a first user 102 can communicate with a second user 116. The first user 102 is associated with a first terminal 104 in the network 100 and the second user 116 is associated with a second terminal 118 in the network 100. The rest of the network 100 is denoted by the cloud 114 in FIG. 1. The first terminal 104 comprises a display 106, a Central Processing Unit (CPU) 108 for processing data, a memory 110 for storing data and a network interface 112 for transmitting data to, and receiving data from, the rest of the network 114. The second terminal 118 comprises a display 120, a CPU 122 for processing data, a memory 124 for storing data and a network interface 126 for transmitting data to, and receiving data from, the rest of the network 114. The network 100 also comprises a server 128. The CPU 108 at the first terminal 104 is able to process image data in order to display an image on the display 106. Image data may be stored in the memory 110. Similarly, the CPU 122 at the second terminal 118 is able to process image data in order to display an image on the display 120. Image data may be stored in the memory 124.

In operation, updates to an image at the first terminal 104 are to be transmitted to the second terminal 118. Image data can be transmitted over the rest of the network 114 from the first terminal 104 to the second terminal 118 using the network interface 112 and the network interface 126. Sections of an image in need of updating can be encoded as tiles. A tile is one block of an image which can be encoded and transmitted from the first terminal 104 to the second terminal 118. The second terminal 118 can use the tile received from the first terminal to update the particular block of the image to which the tile relates.

In preferred embodiments the updates to an image are used for screen sharing between the first terminal 104 and the second terminal 118 in which images displayed on the display 106 at the first terminal 104 are also displayed on the display 120 at the second terminal 118.

Figure 2:
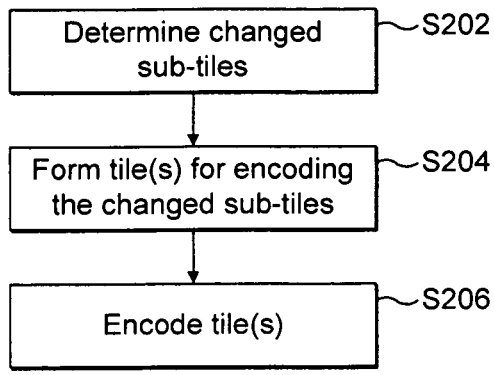
FIG. 2 is a flow chart for a process of processing updates of an image according to a preferred embodiment.

A method of processing updates of an image according to a preferred embodiment is now described with reference to the flow chart of FIG. 2. An image is displayed on the display 106 at the first terminal 104. The image is divided into a plurality of sub-tiles. Each sub-tile comprises more than one picture element (or "pixel") of the image. In preferred embodiments, each sub-tile comprises a block of 32 by 32 picture elements. In preferred embodiments there are a large number of equally sized sub-tiles, for example for an image size of 1024×768 picture elements and a sub-tile size of 32×32 picture elements, the image is divided into 768 sub-tiles.

Updates of the image are transmitted from the first terminal 104 to the second terminal 118 at time intervals. The time intervals may be regular time intervals. However, preferably the time intervals are not necessarily regular and instead the updates are transmitted only when it is determined that a change to the image has occurred. There is typically a minimum time interval between possible updates, but the time interval between updates may vary, and may be very long (e.g. in the order of minutes) when no changes to the image are detected. In step S202 it is determined that a plurality of sub-tiles have changed, and are in need of updating. This determination may comprise determining that the sub-tiles have changed since the last time a tile was formed for the image or since the last update of the image was transmitted to the second terminal 118. The computations performed in the method steps shown in FIG. 2 are based on the sub-tiles, e.g. the changes to the image compared to the previous update of the image are on sub-tile level. The advantage of using sub-tiles is that the computational complexity of computing the changes to the image is significantly reduced compared to not using sub-tiles (which can be considered as using a sub-tile size of 1×1 picture element).

Figure 3:
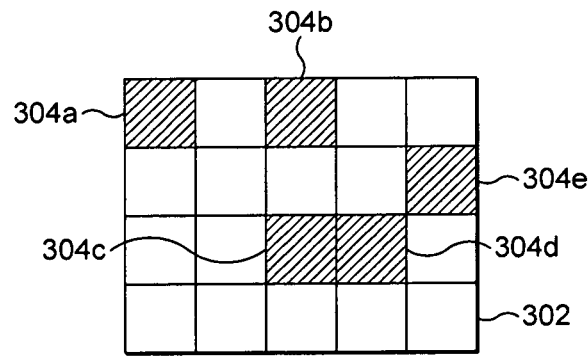
FIG. 3 is a representation of an image highlighting changed sub-tiles.

FIG. 3 shows a representation of an image 302, by way of example. The image 302 has been divided into twenty sub-tiles as shown in FIG. 3 to create four rows and five columns of sub-tiles in the image 302. This is a simplified example. Usually, an image is divided into more than twenty sub-tiles, e.g. 768 sub-tiles as described above. FIG. 3 highlights those sub-tiles in the image 302 which have changed according to the determination in step S202. In the example shown in FIG. 3, five sub-tiles (denoted 304a, 304b, 304c, 304d and 304e) have changed and are in need of updating. The unhighlighted sub-tiles in the image 302 have not changed according to the determination in step S202 and are therefore not in need of updating.

In step S204 a tile or a plurality of tiles are formed for encoding the changed sub-tiles. In order to form a tile, at least one of the changed sub-tiles, as determined in step S202, is selected to form the tile. Where the tile comprises more than one sub-tile, at least one contiguous sub-tile may also be selected to form the tile such that the tile comprises at least one of the changed sub-tiles and at least one contiguous sub-tile. In this step of forming the tile(s) one preliminary tile is created for each area of the screen which has changed. The areas of the screen which have changed are defined by contiguous changed sub-tiles. The areas may also contain non-changed sub-tiles.

Figure 4:
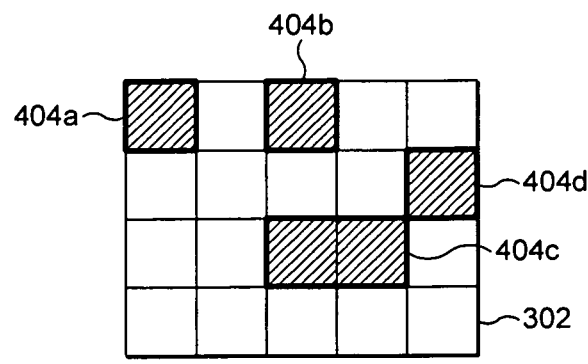
FIG. 4 is a representation of an image according to a first tiling configuration.

FIG. 4 shows four preliminary tiles (404a, 404b, 404c and 404d) which have been created for the areas of changed sub-tiles in the image 302. It would be possible to transmit the four preliminary tiles (404a, 404b, 404c and 404d) from the first terminal 104 to the second terminal 118 so that the second terminal 118 can update the changes to the changed sub-tiles. In this sense FIG. 4 shows a first tiling configuration which could be used for encoding the changed sub-tiles. However, forming the tiles in the configuration shown in FIG. 4 may not be the most efficient way to encode the changed sub-tiles, as described in more detail below.

Step 204 includes determining the configuration of the tile(s) in dependence upon the arrangement of the changed sub-tiles in the array. An algorithm, such as an "efficiency algorithm" may be used in determining the configuration of the tile(s). The preliminary tiles are analyzed and may be changed in order to provide a more efficient encoding of the changed sub-tiles. Both the number of tiles and the actual tiles used to encode the changed sub-tiles may be adapted in order to encode the changed sub-tiles.

Figure 5:
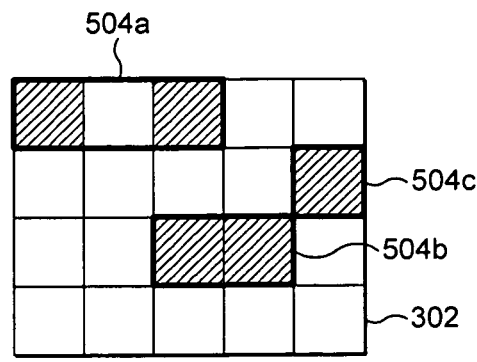
FIG. 5 is a representation of an image according to a second tiling configuration.

A second tiling configuration for encoding the changed sub-tiles is shown in FIG. 5. In FIG. 5 the two changed sub-tiles 304a and 304b (as shown in FIG. 3) are grouped together into a common tile 504a. In FIG. 5 the changed sub-tiles are arranged into three tiles (504a, 504b and 504c). These tiles could be used to encode the changed sub-tiles for transmission to the second terminal 118.

Figure 6:
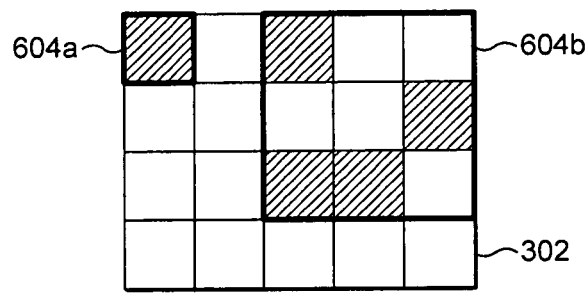
FIG. 6 is a representation of an image according to a third tiling configuration.

A third tiling configuration for encoding the changed sub-tiles is shown in FIG. 6. In FIG. 6 the four changed sub-tiles 304b, 304c, 304d and 304e (as shown in FIG. 3) are grouped together into a common tile 604b. In FIG. 6 the changed sub-tiles are arranged into two tiles (604a and 604b). These tiles could be used to encode the changed sub-tiles for transmission to the second terminal 118.

Figure 7:
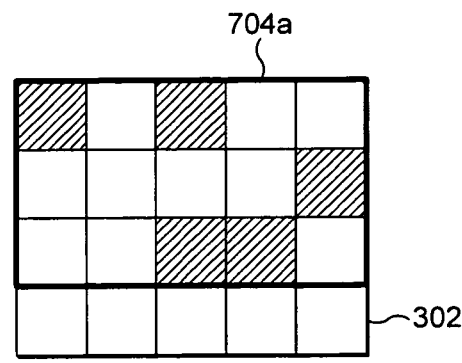
FIG. 7 is a representation of an image according to a fourth tiling configuration.

A fourth tiling configuration for encoding the changed sub-tiles is shown in FIG. 7. In FIG. 7 all five of the changed sub-tiles 304a, 304b, 304c, 304d and 304e (as shown in FIG. 3) are grouped together into a common tile 604b. This tile could be used to encode the changed sub-tiles for transmission to the second terminal 118.

A skilled person would appreciate that different tiling configurations to those described above could also be used to encode the changed sub-tiles.

It can be seen that in the second to fourth tiling configurations shown in FIGS. 5 to 7 at least two of the preliminary tiles (404a to 404d) have been grouped together to form a larger tile. At least one of the tiles in each of the second to fourth tiling configurations (shown in FIGS. 5 to 7) comprises a sub-tile which has not been changed. All of the sub-tiles within a tile are encoded in the tile whether or not they have changed.

FIGS. 4 to 7 provide different configurations for the tile(s) which may be used to encode the changed sub-tiles. The different configurations may each be advantageous in different respects. For example, the tiling configuration shown in FIG. 4 may involve encoding the least amount of data in the tiles because there are no unchanged sub-tiles encoded in the tiles. This is advantageous from the point of view of minimizing the amount of data required to implement the update to the image. However, each tile requires its own header and is compressed separately. Therefore the configuration in FIG. 7 in which only one tile is used to encode all of the changed sub-tiles may be beneficial in terms of reducing bandwidth, depending upon the arrangement of the changed sub-tiles, because the header overhead can be reduced. Furthermore, compressing larger image areas can increase the coding efficiency. For example, for a section of the image that has the same pixel value (such as a completely blue section) it may be more efficient to encode the section in one tile rather than in multiple smaller tiles.

It can therefore be seen that when taking different considerations into account, different configurations for the tile(s) may be best suited for encoding the changed sub-tiles. An efficiency algorithm may be used to determine which is the optimal configuration for the tile(s) for encoding the changed sub-tiles. Advantageously, the configuration of the tile(s) is flexible so that the number of sub-tiles encoded in a tile can be varied. In other words, the selection of which sub-tiles to use for forming the tile(s) is flexible. This allows the configuration of the tile(s) to be adapted in accordance with a particular arrangement of changed sub-tiles as appropriate.

The configuration of the tile(s) may be determined in dependence upon, for example, the complexity of encoding the tile(s), the amount of data in the encoded tile(s), the tile header overhead of the encoded tile(s) and/or the compression efficiency of compressing the encoded tile(s). The configuration of the tile(s) may also be determined in dependence upon other factors than those mentioned here as would be apparent to a person skilled in the art.

Each tile comprises a block of contiguous sub-tiles. Each tile is built from an integer number of sub-tiles. Most image compression algorithms (e.g. Joint Photographic Experts Group (JPEG) compression and Portable Network Graphics (PNG) compression) operate on rectangular images, therefore in order to avoid increasing the complexity of encoding the tiles, the tiles preferably comprise a rectangular section of the image. The term "rectangular section" here is used to mean a quadrilateral section having four right angles. In this sense the "rectangular section" could be in the form of a rectangle whose sides are not all of the same length, and the "rectangular section" could also be in the form of a square whose sides are all of the same length. The tiles can have an arbitrary size, and indeed the number of sub-tiles in each tile can be varied. For example, two tiles of an image with a width (w) of 1024 picture elements and a height (h) of 768 picture elements could have the following attributes:

```
tiles: [
    {seq: 0, x: 0, y: 0, w: 1024, h: 700},
    {seq: 1, x: 0, y: 700, w: 1024, h: 68}
]
```

Here, "seq" indicates the tile number, and "x" and "y" indicate the picture element location of the first picture element in the tile. This example highlights the fact that having tiles which are rectangular sections of the image allows the location of the tiles in the image to be encoded very easily. The attributes given above in the example can be used as sub-tile data to thereby identify the sub-tiles which are included in each of the tiles. It would be possible to use an image format that supports alpha layer which may be able to obtain better compression efficiency by masking out part of the image, as is known in the art.

The tiles are formed in accordance with their determined configurations to thereby include the changed sub-tiles.

In step S206 the tiles are encoded. The encoded tiles can be transmitted from the first terminal 104 to the second terminal 118. The encoded tiles can also be stored in the memory 110 at the first terminal 104. As an example, the encoded tiles can be saved to a file. The encoded tiles can be used to facilitate the reconstruction of the changed image at a later point in time.

As part of encoding the tiles, the tiles can be compressed using an image compression technique. For example, the tiles can be compressed using JPEG compression or PNG compression. It would be apparent to a person skilled in the art how to compress tiles using JPEG compression or PNG compression, so details of these compression techniques are not provided here.

When the tiles are to be compressed it can often be beneficial to group the preliminary tiles shown in FIG. 4 into larger tiles, such as in FIGS. 5 to 7 since the image compression algorithm (e.g. JPEG or PNG compression) may then operate more efficiently due to less header overhead and due to increased compression efficiency. The type of compression used to compress the tiles may effect the determination of the configuration of the tiles.

It is often beneficial to group contiguous sub-tiles which have changed into a common tile. Often this can improve the coding efficiency, e.g. by reducing the tile header overhead, without significantly increasing the amount of data included in the tiles. For the same reasons where a plurality of sub-tiles in close proximity in the array have changed it can be beneficial to group those sub-tiles together in a common tile. Here, the term "close proximity" means that the detrimental effects of including the sub-tiles in a common tile due to increasing the amount of data in the tile are outweighed by the benefits (e.g. a higher coding efficiency) of using a common tile for encoding the changed sub-tiles.

The method steps described above and shown in FIG. 2 can be implemented in software, which may for example be executed on the CPU 108 at the first terminal. Alternatively, those method steps could be implemented in hardware blocks at the first terminal.

Encoded tiles can be transmitted from the first terminal 104. For example, the encoded tiles can be transmitted directly from the first terminal 104 to the second terminal 118 (which may, or may not, be via the network 114). Alternatively, the encoded tiles can be transmitted from the first terminal 104 to the server 128. The server can then transmit the encoded tiles to the second terminal 118. The server may transmit all of the encoded tiles that it receives from the first terminal 104 to the second terminal 118. Alternatively, the server may determine which of the encoded tiles are required to be sent to the second terminal 118 an then transmit only the required encoded tiles to the second terminal 118. For example, where two updates to one section of the image have been made and two corresponding encoded tiles have been sent to the server 128 for updating the same section of the image before the first encoded tile has been transmitted to the second terminal 118, then the server 128 may determine that the first of the two encoded tiles is not required to be sent to the second terminal 118 since it will be updated by the second of the encoded tiles. In that case only the second encoded tile is transmitted to the second terminal 118.

Using standard image compression algorithms for compressing the encoded tiles, such as JPEG and PNG compression, facilitates the implementation of a very simple viewer at the second terminal 118 for viewing the image. In particular, in one embodiment, a view client is executed at the second terminal 118 for viewing the image. The view client is implemented in JavaScript and runs in most modern web browsers.

The method of processing updates of an image described above is very well suited for implementation in a screen sharing process. The updates to the image at the first terminal 104 can be transmitted in real-time to the second terminal 118 where the image can be updated accordingly on the display 120. For the initial image (i.e. an "original" image) to be transmitted to the second terminal, the whole image is encoded as a tile, or as a plurality of tiles. There is nothing special about the original image compared to later versions of the image. The tile(s) covering the whole image comprise all of the sub-tiles to thereby represent the whole image. Where just one tile is used to cover the whole image this can be called a "full tile". The configuration of the tiles is adapted as described above to suit the arrangement of the changed sub-tiles required to update the image. The image data in the encoded tiles is transmitted to the second terminal 118 without using more bandwidth than necessary in the network 100 and can be decoded quickly because it is encoded in an efficient manner according to the determined configuration of tiles.

The second terminal 118 decodes the encoded tiles and can use the sub-tile data in the tiles to identify which sub-tiles are included in each encoded tile in order to re-form the updated image at the second terminal 118. This decoding can be performed by the CPU 118, or by dedicated hardware blocks at the second terminal 118.

In some embodiments, the changed sub tiles are assigned weights. Neighbouring sub-tiles are also assigned weights depending on their distance (or proximity) to changed sub-tiles. Standard clustering techniques (such as k-means), and dimension reduction techniques can then be used to find an optimal tile division for encoding the changed sub-tiles. These techniques may also take other factors such as the tile header overhead and compression efficiency into account. Using weights for the sub-tiles in this way can help to better optimize the configuration of the tiles for encoding the changed sub-tiles.

In some screen sharing systems there may be a plurality of viewer terminals, i.e. second terminals 118. The method described herein can be used in such screen sharing systems, whereby the encoded tiles are sent to each of the second terminals 118 such that they can each update the image displayed at that terminal. This allows an image on the display 106 of the first terminal 104 to be displayed to a plurality of second terminals 118. The encoded tiles may be sent directly from the first terminal 104 to each of the second terminals 118. Alternatively, the encoded tiles may be sent from the first terminal 104 to the server 128, and then server may then transmit the encoded tiles to the plurality of second terminals 118. This alternative implementation may be beneficial as it allows the first terminal 104 to transmit the encoded tiles only once whilst allowing updates of an image to be transmitted to a plurality of second terminals 118.

The method steps described above may be encoded into a computer program product comprising computer readable instructions for execution by computer processing means for carrying out the method steps, as would be apparent to a person skilled in the art. For example the CPU 108 may execute computer readable instructions to thereby perform the method described above in relation to the flowchart of FIG. 2.

The invention may be useful in a number of different contexts where images are required to be updated. The example of screen sharing described above is not the only way in which the invention may be usefully implemented as would be apparent to a person skilled in the art. Furthermore, while this invention has been particularly shown and described with reference to preferred embodiments, it will be understood to those skilled in the art that various changes in form and detail may be made without departing from the scope of the invention as defined by the appendant claims.

The invention claimed is:

1. A method of processing updates of an image for transmission from a first terminal to a second terminal for use in screen sharing between the first terminal and the second terminal wherein updates to the image displayed on a first display at the first terminal are also displayed on a second display at the second terminal, the image being divided into an array of contiguous sub-tiles, each sub-tile comprising more than one picture element of the image, the method comprising:
    determining that a plurality of sub-tiles of the image have changed at the first terminal;
    selecting at least one of said changed sub-tiles and at least one contiguous sub-tile and forming a tile by:
        assigning respective weights to the changed sub-tiles; and
        using the weights in one of a clustering technique and a dimension reduction technique to determine the configuration of the tile; and
    encoding the tile for transmission to the second terminal, said encoding determining sub-tile data identifying which sub-tiles are included in the tile such that the image can be updated at the second terminal in accordance with the changes to said changed sub-tiles,
    wherein the configuration of the tile is flexible such that the number of contiguous sub-tiles encoded in the tile can be varied.

2. The method of claim 1 wherein said forming comprises forming another tile by determining the configuration of the another tile in dependence upon the arrangement of changed sub-tiles in another array.

3. The method of claim 2 wherein the configuration of the another tile is determined using an algorithm to optimize the encoding of the changed sub-tiles in the another tile.

4. The method of claim 2 wherein the configuration of the another tile is determined in dependence upon at least one of: the complexity of encoding the another tile; the total amount of data in the encoded another tile; the tile header overhead of the encoded another tile; and the compression efficiency of compressing the another tile.

5. The method of claim 1 wherein said forming a tile further comprises for another array of contiguous sub-tiles:
    creating a preliminary tile for each contiguous area of said changed sub-tiles; and
    grouping at least two of the preliminary tiles together to form said tile.

6. The method of claim 1 further comprising assigning weights to unchanged sub-tiles according to their proximity to said changed sub-tiles.

7. The method of claim 1 wherein the at least one contiguous sub-tile is encoded in the tile whether or not it has changed.

8. The method of claim 1 wherein said encoding the tile comprises compressing the tile.

9. The method of claim 8 wherein the tile is compressed using one of JPEG compression and PNG compression.

10. The method of claim 1 wherein said step of determining that a plurality of sub-tiles of the image have changed comprises one of: determining that the sub-tiles have changed since the last time a tile was formed for the image; and determining that the sub-tiles have changed since the last time a tile was transmitted to the second terminal.

11. The method of claim 1 further comprising transmitting the encoded tile from the first terminal directly to the second terminal.

12. The method of claim 1 further comprising transmitting the encoded tile from the first terminal to a server.

13. The method of claim 12 wherein the server either (i) transmits the encoded tile to the second terminal, or (ii) determines whether to transmit the encoded tile to the second terminal.

14. The method of claim 1 further comprising storing the encoded tile at the first terminal.

15. The method of claim 1 wherein there are a plurality of second terminals.

16. The method of claim 1 wherein the tile comprises a rectangular section of the image.

17. The method of claim 1 wherein each sub-tile comprises a block of 32 by 32 picture elements of the image.

18. The method of claim 1 wherein in at least some instances, where a plurality of contiguous sub-tiles have changed, they are encoded in a common tile.

19. The method of claim 1 wherein in at least some instances, where a plurality of sub-tiles in close proximity in the array have changed, they are encoded in a common tile.

20. The method of claim 1 wherein a plurality of tiles are formed and encoded for transmission to the second terminal.

21. A terminal configured to transmit updates of an image to a further terminal for use in screen sharing between the terminal and the further terminal wherein updates to the image displayed on a first display at the terminal are also displayed on a second display at the further terminal, the image being divided into an array of contiguous sub-tiles, each sub-tile comprising more than one picture element of the image, the terminal comprising:
    a determiner configured to determine that a plurality of sub-tiles of the image have changed at the terminal;
    a selector configured to select at least one of said changed sub-tiles and at least one contiguous sub-tile to form a tile by:
        assigning respective weights to changed sub-tiles; and
        using the weights in one of a clustering technique and a dimension reduction technique to determine the configuration of the tile; and
    an encoder configured to encode the tile for transmission to the second terminal, said encoder being configured to determine sub-tile data identifying which sub-tiles are included in the tile such that the image can be updated at the further terminal in accordance with the changes to said changed sub-tiles,
    wherein the configuration of the tile is flexible such that the number of contiguous sub-tiles encoded in the tile by the encoder can be varied.

22. The terminal of claim 21 further comprising the first display for use in screen sharing between the terminal and the further terminal.

23. The terminal of claim 21 further comprising a transmitter configured to transmit the encoded tile from the terminal.

24. The terminal of claim 21 further comprising a store configured to store the encoded tile.

25. A network comprising:
a first terminal; and
a second terminal,
wherein the first terminal is configured to transmit updates of an image to the second terminal for use in screen sharing between the first terminal and the second terminal wherein updates to the image displayed on a first display at the first terminal are also displayed on a second display at the second terminal, the image being divided into an array of contiguous sub-tiles, each sub-tile comprising more than one picture element of the image, the first terminal comprising:
a determiner configured to determine that a plurality of sub-tiles of the image have changed at the first terminal;
a selecter configured to select at least one of said changed sub-tiles and at least one contiguous sub-tile to form a tile by:
assigning respective weights to the changed sub-tiles; and
using the weights in one of a clustering technique and a dimension reduction technique to determine the configuration of the tile; and
an encoder configured to encode the tile for transmission to the second terminal, said encoder being configured to determine sub-tile data identifying which sub-tiles are included in the tile such that the image can be updated at the second terminal in accordance with the changes to said changed sub-tiles,
wherein the configuration of the tile is flexible such that the number of contiguous sub-tiles encoded in the tile by the encoder can be varied, and wherein the second terminal comprises:
a receiver configured to receive the encoded tile; and
an updater configured to update the image at the second terminal in accordance with the changes to said changed sub-tiles.

26. The network of claim 25 wherein the second terminal further comprises a decoder configured to decode the encoded tile to thereby determine which sub-tiles are included in the tile using the sub-tile data.

27. The network of claim 25 wherein the second terminal is configured to execute a view client in a web browser to display the image at the second terminal.

28. The network of claim 25 further comprising a server configured to receive the encoded tile from the first terminal.

29. A computer system comprising: a processor; and a computer program product comprising stored computer readable instructions for execution by the processor at a first terminal for transmitting updates of an image from the first terminal to a second terminal for use in screen sharing between the first terminal and the second terminal wherein updates to the image displayed on a first display at the first terminal are also displayed on a second display at the second terminal, the image being divided into an array of contiguous sub-tiles, each sub-tile comprising more than one picture element of the image, the instructions comprising instructions to perform operations comprising:
determining that a plurality of sub-tiles of the image have changed at the first terminal;
selecting at least one of said changed sub-tiles and at least one contiguous sub-tile and forming a tile by:
assigning respective weights to changed sub-tiles; and
using the weights in one of a clustering technique and a dimension reduction technique to determine the configuration of the tile; and
encoding the tile for transmission to the second terminal, said encoding determining sub-tile data identifying which sub-tiles are included in the tile such that the image can be updated at the second terminal in accordance with the changes to said changed sub-tiles,
wherein the configuration of the tile is flexible such that the number of contiguous sub-tiles encoded in the tile can be varied.

* * * * *